United States Patent Office 3,317,472
Patented May 2, 1967

3,317,472
THERMOSETTING POLYBISPHENOLS
Chester W. Fitko and Abraham Ravve, Chicago, Ill., assignors to The Continental Can Company, Inc., New York, N.Y., a corporation of New York
No Drawing. Filed Aug. 6, 1963, Ser. No. 300,180
8 Claims. (Cl. 260—50)

This invention relates to thermosetting polybisphenol metal coating enamels and particularly to phenolated and aldehydic cross-linked alkylene-carbon monoxide copolymers. These polybisphenols exhibit the property of wetting metal surfaces to which they are applied and when cured show a high resistance to mechanical deterioration.

The problem of providing a flexible coating resin for light weight metal stock has long existed. In metal container fabrication such a coating is desirable for contents protection; the purpose, generally, being to provide an interior surface of low chemical reactivity. The provision of coatings in containers such as metal food cans is economically to be performed prior to fabrication of the metal stock into container blanks or other forms.

Many previously proposed resins have not met with success due to their lack of flexibility. Many such coatings do not adhere firmly to the metal surface and have cracked and peeled during bending or drawing of the metal stock into container elements. This effect is pronounced in the attempted use of unmodified phenol-formaldehyde enamels on tin plate.

Previous ethylene-carbon monoxide copolymers have not been used for such fabricated metal stock. This appears to be due in part to the thermoplastic nature of such copolymers. These copolymers will melt or dissolve into the contents of containers internally coated therewith when such containers are thermally sterilized or pasteurized. Mixing these copolymers with thermosetting resins such as phenol-formaldehyde resins does not appreciably alter this temperature sensitive property.

This invention provides a backbone alkylene-carbon monoxide copolymer which has at least a part of the carbonyl oxygens replaced by two phenolic groups. This new material is a polybisphenol of unique character. This polymer is then cross-linked by an aldehyde-type group to produce a novel curable and flexible composition of matter which, when applied on metal stock and thermoset, permits fabrication and bending without cracking or peeling.

Another object of this invention is to provide a container enamel which will exhibit the property of slickness or low frictional effect at the interface with respect to contained substances. The novel backbone polybisphenol may be prepared in such a manner that the coated enamel produced adheres firmly and will not crack or peel and which will allow easy removal of viscous substances therefrom. These new polybisphenols and their aldehyde reaction products may advantageously be used for wire coatings, potting compounds and laminates, as well as other applications where phenolic resins have been employed in the past, in addition to being employed as a metal surface coating.

A further object is to provide a curable metal coating polybisphenol resin which exhibits superior metal wetting properties.

Another object is to provide a curable metal coating which exhibits high flexure stability and which cures to a pleasing color which is compatible with food packaging requirements.

Briefly described, the method of preparing the novel polybisphenol and aldehydic reaction products thereof is to prepare a polyketone resin of the alkylene-carbon monoxide type and then phenolate the same in an acid medium to form a polyketone-phenol condensate. This condensate is then reacted with an aldehyde type of compound to cross-link condensate backbone chains of adjacent molecules through the phenolic radicals. The carbonyl-to-alkyl radicals ratio in the polyketone can be varied, as can the degree of phenolation, to produce a range of desired products.

The alkylene radicals are preferably ethylene radicals.

The examples which follow illustrate the practice of this invention and demonstrate operable conditions and are not intended to be limitative. Parts are by weight, unless otherwise specified.

EXAMPLE I

Reactant: Parts
Phenol (pure) _____ 188
Polyketone _____ 30
Phosphoric acid (86%) _____ 4
Triethylamine _____ 40
Formaldehyde in methyl alcohol (55%) _____ 110

The phenol reactant refers to monohydroxy-benzene. The polyketone was of the following formula:

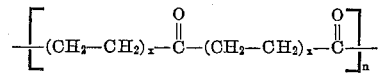

where: $x$ are numbers such that the mole ratio $C_2H_4:CO$ is from 2.5:1 to 8.0:1 and $n$ is the molecular weight multiple. The respective melt viscosity range of such polyketones is from 55 to 1250 poises at 125° C. One specific polyketone used has a $C_2H_4:CO$ ratio of 2.5:1 with a melt viscosity of 55 poises at 125° C.

The polyketone and the phosphoric acid, as catalyst, were added to the phenol maintained in a molten state at 40–60° C. and the condensation reaction carried out for approximately 15 hours at 55° C. Under the acidic condition created by the acid, the polyketone and phenol react to form a novel polybisphenol which served as the basic polymer of the instant thermosetting product.

The triethylamine was then added to raise the pH of the mixture above 7.0. The formaldehyde solution (methyl formcel) was then added and the mixture heated at 60° C. for one hour and then the temperature increased to 90–95° C. and maintained for about 10 hours. At this time the condensation reaction had advanced the resin to a strokes cure of 63 seconds at 150° C. The triethylamine catalyzed the condensation reaction between the formaldehyde and the phenol groups of the polybisphenol to yield methylol groups attached to the phenol groups. Upon heating these methylol groups will cross-link with other phenol groups to form the final cross-linked resin. When the triethylamine is added to the phosphoric acid catalyzed mixture, some of the amine reacts with the acid to yield triethylamine hydrogen phosphate salt which is a water soluble salt.

The product thus formed exhibited a strokes cure at 150° C. of 63 seconds. The strokes cure test is a practical method for measuring the degree or extent of the condensation reaction between the phenolic bodies and formaldehyde. The tests consists of pouring about 0.5 ml. of resin on polished hot plate surface heated to 150° C. The resin is stroked slowly with a spatula until the resin gels. The time in seconds required to gel is the "strokes cure."

The triethylamine was stripped with heat under vacuum, and the resin was water washed at 60–80° C. at least three times to remove the water soluble phosphate salts. The resin was then dehydrated under heat and vacuum, and thus, diluted with a mixture of equal parts of amyl alcohol and methyl isobutyl ketone to a workable viscosity for application on tin plate with a roll coater.

A suitable coating viscosity range over which the condensate product may be coated to metal substrates is 25 to 50 seconds at 25° C. with a CCC Cup. This cup viscosity measurement has been developed for use in evaluating the fluidity, prior to coating, of such resins as the instant invention defines. The above range corresponds to 60 to 175 centipoise viscosity at 25° C.

This novel polybisphenol product exhibits a satisfactory wetting property on tinplate and yields upon baking for curing a flexible coating which does not crack upon or peel from the metal substrate during bending of the same into container forms. The enamel was baked to cure, on a metal substrate, at 385° C. for 8–10 minutes and the coating resulting was a transparent, tough film of slightly golden hue.

Comparative data for the instant coating and other commonly used organic enamels showing the resistance to mechanical deterioration is set out in Table 1. The coating designated as 1 and 2 are those used in present practice. The "fabrication rating" numbers given are of arbitrary units and have significance through relative comparison. The term "fabrication rating" is used to denote the absence of cracking and peeling of the coating as the light weight metal substrate is bent and drawn into container elements, i.e., a higher "fabrication rating" means that less cracking and peeling of the coating was observed after testing. The improved flexibility can be seen by the high rating number of 75.0 for the resin of this invention over the lower ratings for the commonly used resin coatings.

Table 1

Resin coating: Fabrication rating
(1) Standard phenolic resin _____ 68.3
(2) Plasticized phenolic resin _____ 70.0
(3) Polyketone-phenol-formaldehyde resin ___ 75.0

The product of the instant invention has particular utility in the manufacture of tinplate food containers wherein economic considerations dictate that the tin stock be coated with the final food protecting covering prior to container fabrication. The resin may be coated onto sheet tin stock and the latter blanked and shaped into containers without the usual cracking and peeling problems. The coating is firmly attached to the tinplate, which is in part due to the satisfactory wetting properties as applied. The color of the coating was a slightly golden hue which provides the necessary eye appeal to meet the food package criterion of customer acceptability.

To provide a metal plate coating which has particular advantages for food container uses the following preparation can be made:

EXAMPLE II

Reactant or catalyst: Parts
Phenol (pure) _____ 188
Polyketone _____ 30
p-Toluenesulfonic acid _____ 1.0
Triethylamine _____ 30
Formaldehyde in methyl alcohol (55%) ____ 110

The phenol and polyketone used were the same as in Example 1. The polyketone and p-toluenesulfonic acid were added to the phenol and batch reacted for approximately 15 hours at 20° C. and then for six hours at 67° C. The triethylamine was then added to raise the pH of the mixture above 7.0. The formaldehyde solution was then added and the mixture heated at 60° C. for one hour to initiate the formation of reactive methylol groups on the phenolic bodies. The condensation was continued at 90–95° C. for 10 hours. The resulting product exhibited a strokes cure at 150° C. of 50 seconds.

Purification steps were carried out as follows: the triethylamine was stripped with heat under vacuum, the total product washed at least three times with water at 60–80° C. and then dehydrated with heat under vacuum. The desired coating viscosity was attained by adding a mixture of equal parts of amyl alcohol and methyl isobutyl ketone.

The presence of the long alkyl backbone chain lengths of the polymer give the final product a slickness property which is desirable for may food packaging uses. Similar flexibility, metal wetting qualities, and color properties were exhibited by this resin at those described for Example 1.

The property of slickness is highly desirable in tin container packaging of such foods as luncheon meats which have a tendency to stick to the container wall and thus to resist removal.

The reactions occurring in Examples II and II may be diagrammed as follows:

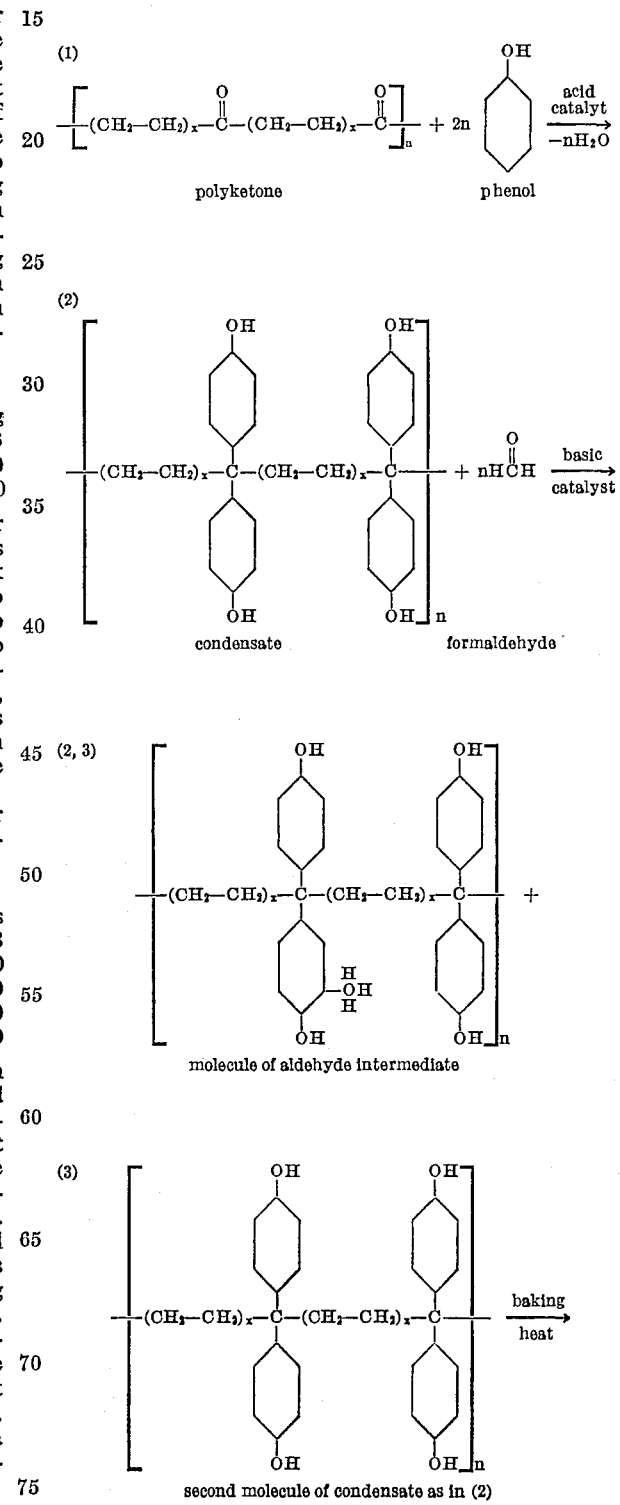

(3)
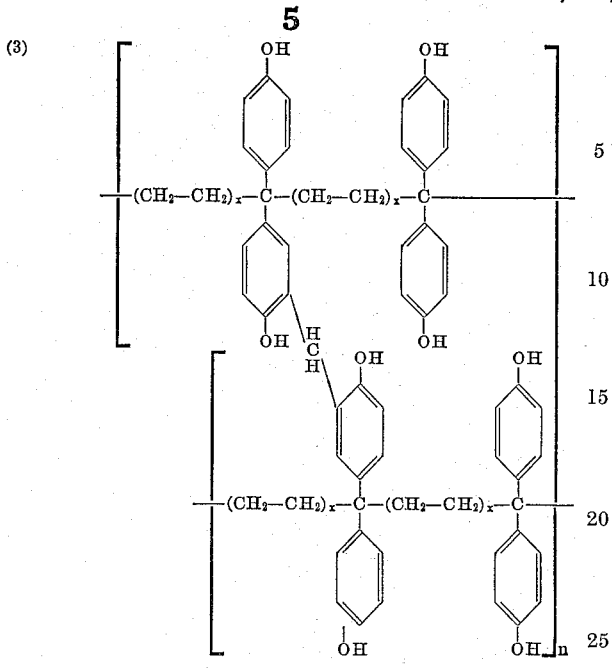

PRODUCT RESIN

In these diagrams $x$ and $n$ are as defined in Example I and phenol and formaldehyde have been used for simplicity of illustration.

In Examples I and II the condensation reaction between the phenol and the polyketone occurs with maximum yield and with the least side reactions at low temperatures. A relatively weak acid such as phosphoric acid catalyzes the reaction satisfactorily at about 55° C. for 15 hours. With stronger acids, such as 72 percent sulfuric acid, better results are obtained when condensation temperatures are maintained below 40° C. Following the above results other acid condensation catalysts can be used.

The phenol component of Examples I and II can be replaced in whole or in part by ortho-cresol and para-cresol with a similar cross-linking enamel coating resulting. Generally, phenols having at least two unsubstituted ortho and/or para positions can be used for phenol, and should be condensed with the polyketone within the ratio of two to six moles per mole of carbonyl group.

The formaldehyde employed as methyl formcel in Examples I and II may be replaced in whole or in part by paraformaldehyde, hexamethylene tetramine and other formaldehyde yielding compounds. The formaldehyde component should be used in the ratio of two to three moles per mole of carbonyl group of the original polyketone.

The triethylamine set out in Examples I and II functions as a basic catalyst. Other basic catalysts may be used in whole or in part, for example ammonia, potassium hydroxide, and sodium hydroxide may be used. Such basic catalysts should be used in amounts sufficient to raise the pH of the reacting medium to 8.0 and preferably into the range of 9–10.

The polybisphenol produced by the acid catalyzed condensation reaction of Examples I and II can also be cured or cross-linked with a resole type phenolic resin in lieu of cross-linking with formaldehyde. Alternately, the polybisphenol may be methylolated with formaldehyde as shown at diagram equation line (2,3), above, and then coreacted with a resole type phenolic resin, an amine type phenolic resin, and/or novolak resin.

Inert volatile solvents for the final product are amyl alcohol and methyl isobutyl ketone. Other solvents may be used.

As stated above, the polyketone reactant may have an ethylene to CO ration of from 2.5:1 to 8.0:1. The properties of the final resin are controlled by variation of this ratio between the stated limits. Generally, the polyketones having ratios in the high end of this range exhibit greater flexibility and lower thermosetting characteristics. The final product variability may thus be controlled to meet the particular use specification. The molecular weights of polymers in the above ratio range vary and are measured as melt viscosity at 125° C. Measurements show viscosities in the range of 55 to 1250 poises.

The novel polymer of this invention is a curable or thermosettable product after the methylolation reaction step wherein the aldehydic compound causes methylol groups to be attached to the phenolic groups of the backbone polybisphenol. Upon heating the methylol groups are caused to react with adjacent phenol groups to produce the final thermoset or cured resin product.

It is obvious that the illustrative practices are not restrictive; and that the invention can be practiced in many ways within the scope of the appended claims.

What is claimed is:
1. A process for preparing a metal surface wetting, curable, and flexible resin product comprising the steps of:
    (a) condensing in acid medium an alkylene-carbon monoxide copolymer having an alkylene-carbon monoxide mole ratio in the range of 2.5:1 to 8.0:1 with a phenolic compound selected from the group consisting of phenols having at least 2 unsubstituted ortho- and para-positions to form a polyketone phenolic compound condensate, and subsequently,
    (b) reacting said condensate with a formaldehyde yielding compound in basic medium to methylolate a portion of the phenolic groups of the polyketone-phenol condensate.
2. The process of claim 1 wherein the condensing step is carried out in the presence of at least one of the acids selected from the group consisting of: phosphoric acid, p-toluene sulfonic acid and sulfuric acid, and said reacting step is carried out in basic medium in the presence of a basic catalyst selected from the group consisting of: triethylamine, sodium hydroxide, potassium hydroxide and ammonia.
3. The process of claim 1 wherein the phenolic compound is selected from the group consisting of phenol, o-cresol and p-cresol.
4. The process of claim 1 wherein the formaldehyde yielding compound is selected from the group consisting of formaldehyde, paraformaldehyde, and hexamethylene tetramine.
5. The process of claim 1 wherein the alkylene-carbon monoxide copolymer is an ethylene-carbon monoxide copolymer.
6. The process of claim 1 wherein the alkylene-carbon monoxide copolymer is reacted with 2 to 6 moles of the phenolic compound per mole of carbonyl group to form a backbone chain, and thereafter methylolating a portion of the phenolic compound groups on the backbone chain with 2 to 3 moles of a formaldehyde yielding compound per mole of original carbonyl group.
7. The process of claim 1 wherein the basic medium has a pH in the range of 8.0 to 10.0.
8. The product obtained by the process of claim 1.

References Cited by the Examiner

FOREIGN PATENTS 583,174   12/1946   Great Britain.

WILLIAM H. SHORT, *Primary Examiner.*

H. E. SCHAIN, *Assistant Examiner.*